(12) United States Patent
Almousa et al.

(10) Patent No.: US 11,577,431 B2
(45) Date of Patent: Feb. 14, 2023

(54) ACTIVE SELF-SHAPING NON-NEWTONIAN FLUID BASED SYSTEM AND METHOD FOR RAPID MOLD TOOLING

(71) Applicant: Saudi Arabian Oil Company, Dhahran (SA)

(72) Inventors: Hassan Almousa, Dhahran (SA); Mohamed Bouhrara, El Jadida (MA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/029,838

(22) Filed: Sep. 23, 2020

(65) Prior Publication Data
US 2022/0088835 A1     Mar. 24, 2022

(51) Int. Cl.
*B29C 33/38* (2006.01)

(52) U.S. Cl.
CPC .................................. *B29C 33/3857* (2013.01)

(58) Field of Classification Search
CPC ............ B29C 33/3857; B29C 33/3842; B29C 45/376; B21D 22/12
See application file for complete search history.

(56) References Cited

U.S. PATENT DOCUMENTS

| | | | | |
|---|---|---|---|---|
| 4,968,237 A | * | 11/1990 | Persson | B29C 45/37 425/468 |
| 5,796,620 A | * | 8/1998 | Laskowski | G05B 19/4207 700/118 |
| 6,578,399 B1 | * | 6/2003 | Haas | B21D 47/00 72/413 |
| 6,827,325 B2 | | 12/2004 | Hofmann et al. | |
| 7,422,714 B1 | | 9/2008 | Hood et al. | |
| 7,896,019 B2 | | 3/2011 | Bettin et al. | |
| 8,091,692 B2 | | 1/2012 | Deshmukh et al. | |

(Continued)

FOREIGN PATENT DOCUMENTS

CN        110216184 A        9/2019

OTHER PUBLICATIONS

Meier, Tobias. Magnetoresistive and Thermoresistive Scanning Probe Microscopy with Applications in Micro-and Nanotechnology. vol. 25. KIT Scientific Publishing, 2014.

(Continued)

*Primary Examiner* — Seyed Masoud Malekzadeh
(74) *Attorney, Agent, or Firm* — Leason Ellis LLP

(57) ABSTRACT

Systems and methods for rapid mold tooling fabrication using active self-shaping non-Newtonian fluids is provided. The rapid mold fabrication system includes one or more molding units between which molds are formed using compression or injection molding process. Each molding unit includes an array of hydraulic pillars that controllably adjust the position of mold preform layers, and an expandable fluid chamber between the end of the pillars and the preform layer against which a mold is formed. A control system is also provided for controlling the volume of STF within the chamber and for transitioning the STF from a liquid to a solid phase through application of an electrical stimulus. A (Continued)

method is also provided for manufacturing a mold using the system. A method is also provided for measuring the geometric properties of objects using the rapid mold fabrication system.

7 Claims, 9 Drawing Sheets

(56) References Cited

U.S. PATENT DOCUMENTS

| | | | |
|---|---|---|---|
| 8,092,210 B2* | 1/2012 | Lopez | B27N 3/08 |
| | | | 249/161 |
| 8,939,200 B1 | 1/2015 | Gilstad et al. | |
| 8,956,145 B2* | 2/2015 | Johnson | B29C 43/3642 |
| | | | 425/394 |
| 9,427,898 B2* | 8/2016 | Percival, Jr. | B29C 33/0011 |
| 9,552,915 B2* | 1/2017 | Khan | B29C 33/308 |
| 10,351,287 B2* | 7/2019 | Eberbach | B65B 55/20 |
| 10,603,835 B2* | 3/2020 | Hall | B29C 33/302 |
| 11,001,016 B2* | 5/2021 | Vlavianos | B29C 33/02 |
| 2004/0262816 A1* | 12/2004 | Parks | B29C 43/36 |
| | | | 264/324 |
| 2006/0231357 A1 | 10/2006 | Jolly et al. | |
| 2015/0084237 A1* | 3/2015 | Siagam | B29C 70/28 |
| | | | 425/383 |
| 2015/0248960 A1* | 9/2015 | Khan | H01F 7/064 |
| | | | 361/143 |
| 2015/0352775 A1* | 12/2015 | Geshlider | B29C 51/30 |
| | | | 264/222 |
| 2018/0222107 A1* | 8/2018 | Hall | B29C 51/30 |

OTHER PUBLICATIONS

Meng, Harper, and Guoqiang Li. "A review of stimuli-responsive shape memory polymer composites." Polymer 54.9 (2013): 2199-2221.

X. Gong et al. 'Mechanical properties and mechanism of shear thickening fluid', Guti Lixue Xuebao/Acta Mechanica Solida Sinica, 2016, 12, 518-537.

S. Gurgen et al.: 'Shear thickening fluids in protective applications: A review', Progress in Polymer Science, 2017, 12. 48-72.

C. Zhao et al.: 'Electrokinetics of non-Newtonian fluids: A review', Advances in Colloid and Interface Science, 2013, 94-108.

Ding, Jie, et al. "Review on shear thickening fluids and applications." (2013): 161.

Tian, Yu, et al. "Reversible shear thickening at low shear rates of electrorheological fluids under electric fields." Physical Review E 83.1 (2011): 011401.

Tian, Yu, et al. "A shear thickening phenomenon in magnetic field controlled-dipolar suspensions." Applied Physics Letters 97.15 (2010): 151904.

Nelson, Jake W., et al. "Injection Molding with an Additive Manufacturing Tool: Study shows that 3D printed tools can create parts comparable to those made with P20 tools, at a much lower cost and lead time." Plastics Engineering 73.7 (2017): 60-66.

* cited by examiner

ID OF THE DISCLOSURE

ACTIVE SELF-SHAPING NON-NEWTONIAN FLUID BASED SYSTEM AND METHOD FOR RAPID MOLD TOOLING

FIELD OF THE DISCLOSURE

The present disclosure is directed to systems for manufacturing mold tooling used for injection or compression molding. In particular, the technology relates to systems for manufacturing mold tooling using non-Newtonian fluids.

BACKGROUND OF THE DISCLOSURE

With the increase demand of industrial manufactured goods, rapid prototyping and tooling has become more valuable than ever. However, compression or injection molding part manufacturing processes have always had the challenge of requiring a specific mold tooling design for each part.

Mold tooling design is critical for a successful molding process and this includes dimensioning, sprue gates location, dimensioning of shear edges, cooling and ejecting techniques, and the like. However, the main limitation of conventional mold design is tailoring the dimensions for each part and material. For instance, if a manufacturer decides to change the material used or the dimensions of a final product, a completely new design-for-manufacturing (DFM) process must be performed to obtain a mold for creating the updated final product.

Moreover, the advanced technologies for precision mold design suffer from several issues that occur in, but not limited to, injection molding and they are attributed to having no control over the mold dimensions during the process. For example, flow lines, sink marks, vacuum voids, and warping are major hindrances in such manufacturing process.

More recently, additive manufacturing (AM) is used for rapid mold tooling and prototyping by the use of polymeric or metallic three-dimensional (3D) printing materials. However, the time needed to construct a passive 3D printed mold is still subjected to time consumption. Additionally, the 3D printed mold requires internal supports for any hollow structures which requires an additional step of removing these supports.

It is with respect to these and other considerations that the disclosure is presented.

SUMMARY OF THE DISCLOSURE

According to an aspect of the present disclosure, there is provided a rapid mold tooling fabrication system using non-Newtonian shear thickening fluid (STF). The system comprises at least one molding unit including, a frame encompassing a fabrication area. The molding unit also includes a plurality of actuatable hydraulic pillars arranged in a two-dimensional array. More specifically, each hydraulic pillar extends in a first direction to a distal end and is configured to be extended or retracted along the first direction. The molding unit also includes an expandable STF chamber comprising a first preform layer and an opposing second preform layer. In particular, the first preform layer is a boundary layer and extends across the distal ends of the hydraulic pillars such that the pillars push or pull against the boundary layer when extended or retracted. Additionally, the second preform layer is an interface layer having an outer surface against which a mold can be formed. The molding unit further includes a fluid storage unit for storing the STF and configured to pump the STF into the STF chamber during operation. Also provided is an electrical charge source electrically coupled to a signal emitter circuit, which is provided at one or more of the first and second preform layers. The electrical charge source and signal emitter circuits are configured to output an electric signal suitable for transitioning the STF from a liquid to a solid state.

The system further comprises a controller comprising a non-transitory computer readable storage medium and a processor electronically coupled to the storage medium, the electrical charge source and the fluid storage unit. The processor is configured by executing instructions stored on the storage medium to cause the plurality of pillars to respectively extend or retract according to a prescribed shape and cause STF to be pumped from the fluid storage unit into the fluid chamber. The processor is also configured to cause the electrical charge source and the signal emitter circuit to apply the electric signal to the STF within the chamber and thereby transitioning the STF from a liquid to a solid state. Additionally, the processor is configured to initiate a molding process, wherein compression of a material placed against the interface layer during the molding process forms the mold having the prescribed shape.

According to a further aspect, a method of rapid mold tooling fabrication using a non-Newtonian shear thickening fluid (STF) is disclosed. The method comprises providing a molding unit. In particular, the molding unit includes a frame encompassing a fabrication area. The molding unit also includes a plurality of actuatable hydraulic pillars arranged in a two-dimensional array, wherein each hydraulic pillar extends in a first direction to a distal end and is configured to be extended or retracted along the first direction. The molding unit also includes an expandable STF chamber comprising a first preform layer and an opposing second preform layer. More specifically, the first preform layer is a boundary layer and extends across the distal ends of the hydraulic pillars such that the pillars push or pull against the boundary layer when extended or retracted. Additionally, the second preform layer is an interface layer having an outer surface against which a finished mold can be formed. The molding unit further comprises a fluid storage unit for storing the STF and configured to pump the STF into the STF chamber during operation. The molding unit also includes an electrical charge source electrically coupled to a signal emitter circuit provided at one or more of the first and second preform layers. In particular, the electrical charge source and signal emitter circuits are configured to output an electric signal suitable for transitioning the STF from a liquid to a solid state. The molding unit also includes a controller comprising a non-transitory computer readable storage medium and a processor electronically coupled to the storage medium, the electrical charge source and the fluid storage unit, wherein the processor is configured by executing instructions stored on the storage medium.

The method also includes the step of defining, using the molding unit, a preform mold for forming a finished mold having a prescribed shape. More specifically, the step of defining the preform mold includes selectively adjusting a respective length of the plurality of pillars according to the prescribed shape, pumping a volume of STF from the fluid storage unit into the fluid chamber, and applying, with the electrical charge source via the signal emitter circuit, the electric signal to the STF within the chamber and thereby transitioning the STF from a liquid to a solid state.

The method further includes the steps of placing a material to be molded into the finished mold against the interface layer, compressing the material against the interface layer thereby imparting the prescribed shape onto the material and, after a curing period, releasing the finished mold having the prescribed shape from the interface layer.

According to a further aspect, a method of rapid mold tooling fabrication using active self-shaping non-Newtonian fluid is provided. The method comprises providing a molding system comprising two molding units. In particular, each molding unit includes a frame encompassing a fabrication area and a plurality of actuatable hydraulic pillars arranged in a two-dimensional array, wherein each hydraulic pillar extends in a first direction to a distal end and is configured to be extended or retracted along the first direction. Each molding unit also includes an expandable STF chamber comprising a first preform layer and an opposing second preform layer, wherein the first preform layer is a boundary layer and extends across the distal ends of the hydraulic pillars such that the pillars push or pull against the boundary layer when extended or retracted, and wherein the second preform layer is an interface layer having an outer surface against which a finished mold can be formed. Each molding unit further includes a fluid storage unit for storing the STF and configured to pump the STF into the STF chamber during operation, as well as a signal emitter circuit provided at one or more of the first and second preform layers. In particular, the signal emitter circuit is electrically coupled to an electrical charge source configured to output an electric signal via the signal emitter circuit that is suitable for transitioning the STF from a liquid to a solid state. The molding system further comprises a controller including a non-transitory computer readable storage medium and a processor electronically coupled to the storage medium, the electrical charge source and the fluid storage unit, wherein the processor is configured by executing instructions stored on the storage medium.

The method of rapid mold tooling fabrication also includes the step of measuring, using the first and second molding units, geometric properties of an object placed within the fabrication area between the first and second molding units. In particular, the measuring step includes the steps of, while the pillars of each of the first and second molding units in at least a partially extended state and the STF within the chamber of the first and second molding units is in a viscous state, closing the first and second molding units around the object such that the pillars and STF of the first and second molding units conform to the object. The measuring step also includes the step of applying an electrical signal to the STF within the STF chamber of each the first and second molding units to transition the STF to a rigid state. Additionally, the measuring step includes determining, for each the first and second molding units, respective system parameters including a respective position of the pillars, and determining the geometric properties of the object from the measured respective system parameters.

These and other aspects, features, and advantages can be appreciated from the accompanying description of certain embodiments of the disclosure and the accompanying drawing figures and claims.

BRIEF DESCRIPTION OF THE DRAWINGS

The foregoing and other features of the arrangements of the present disclosure will be more readily apparent from the following detailed description and drawings of an illustrative embodiment of an invention encompassed by the disclosure.

DESCRIPTION OF CERTAIN EMBODIMENTS OF THE DISCLOSURE

By way of overview and introduction, the present application describes devices and methods for manufacturing molds ("mold tooling"). For example and without limitation the mold tooling can be suitable for use in compression and injection molding part manufacturing systems. In particular, the technology relates to systems and methods for rapid mold fabrication using non-Newtonian fluids, which can be transitioned from liquid to solid state by application of an electrical current. While the exemplary rapid mold fabrication systems and methods can be configured to manufacture mold tooling, they can similarly be used to mold other molded objects.

The rapid mold fabrication system consists of three major components, namely, hydraulic pillars that adjust the position of mold preform layers, and control systems for applying a non-Newtonian fluid material (the "shear thickening fluid" or "STF") over the preform layer and for setting the STF material to a solid state. In particular, embodiments of the rapid mold fabrication systems rely on the use of a non-Newtonian STF that can be changed from a liquid to solid phase by application of an electrical current or another type of stimulus to the STF.

Figure 1A:
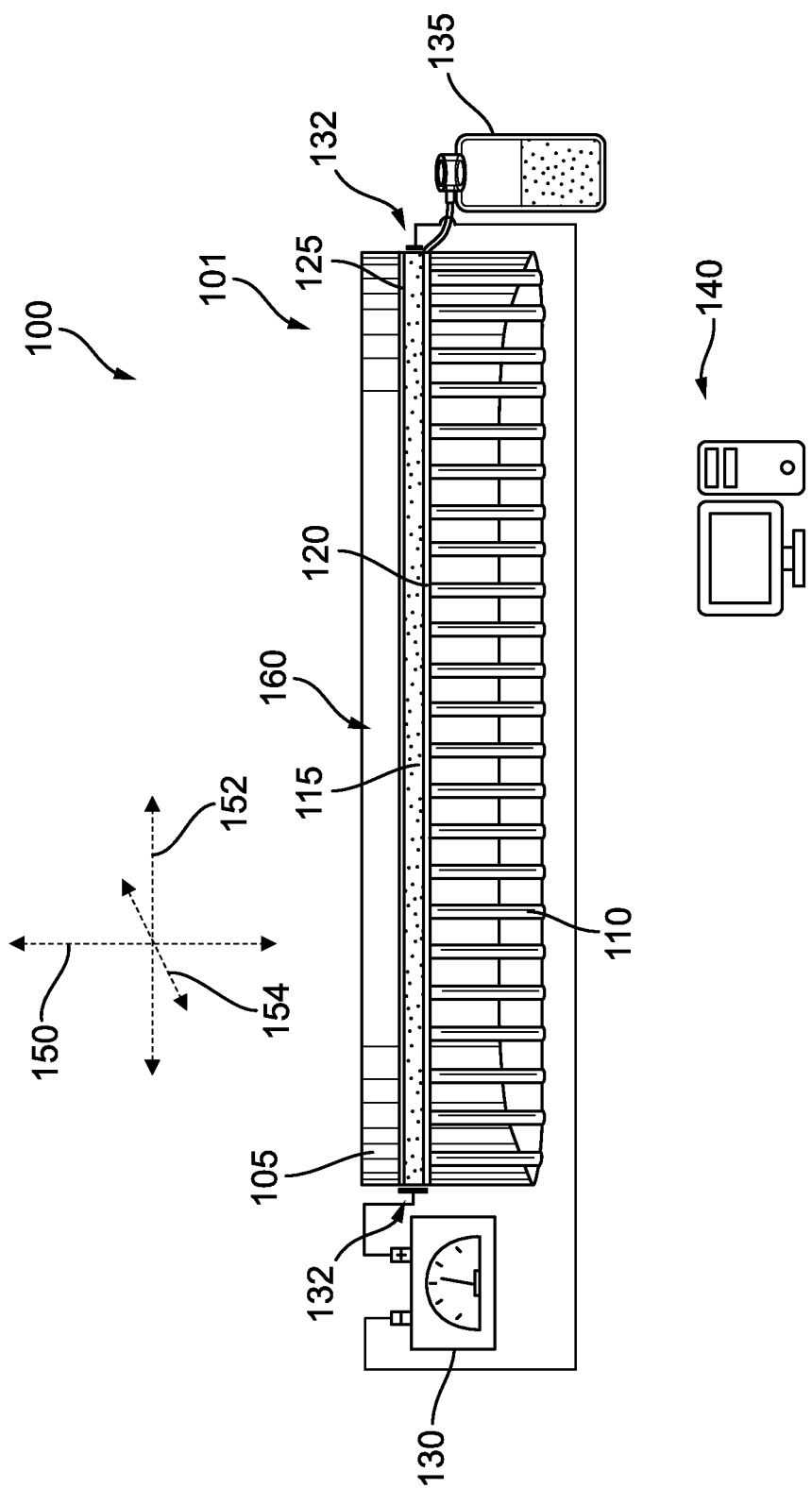
FIG. 1A is a side-view system diagram of an exemplary rapid mold fabrication system according to an embodiment.
Figure 1B:
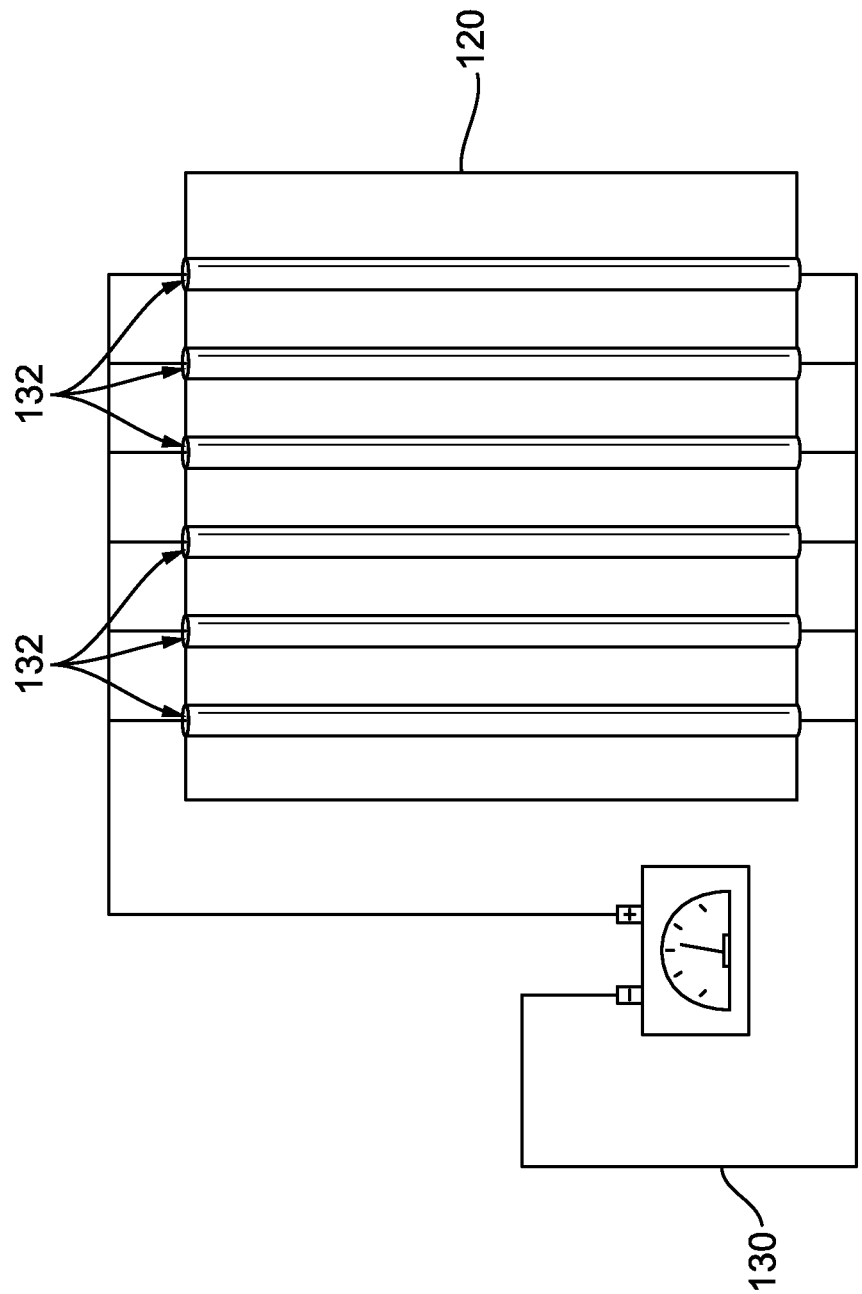
FIG. 1B is a top-view diagram showing an exemplary configuration of electric signal emitting circuits of a boundary layer of the system of FIG. 1A according to an embodiment.

FIG. 1 is a high-level side-view system diagram of an exemplary rapid mold fabrication system 100 using a non-Newtonian STF in accordance with one or more embodiments. For simplicity, FIG. 1 shows only the lower molding unit 101 of the mold fabrication system 100 configured to manufacture a compression mold. As shown in FIG. 2B the system 100 would further comprise an upper molding unit (102, shown in FIG. 2B), which mirrors the lower unit and is provided opposite the lower unit such that a mold can be formed in the mold fabrication space between the upper and lower units.

As would be understood, the upper molding unit 102 is used to define the geometry of one side of the mold being produced by the system 100 (e.g., the upper side) and the lower molding unit 102 is used to define the geometry of the opposite side of the mold. During mold creation using the system 100, the preform molds defined by the upper and lower units impart their respective shapes onto the mold material, thereby producing a final mold usable for compression molding a part.

Each the upper and lower unit of the system 100 comprises the following primary components, a mold frame 105, hydraulic pillars 110, shear thickening fluid (STF) 115, a boundary layer 120, an interface layer 125, one or more electrical charge sources 130, and fluid storage unit 135 and a control circuit 140. These elements complement each other to provide a dynamic system for rapid self-shaping mold tooling manufacturing.

The control circuit 140 is configured to control the operation of various components of the system 100, particularly, to control movement of the hydraulic pillars 110, to control the release of STF from the storage unit 135 into the space between the interface layer 125 and the boundary layer 120, and to control the application of electrical stimulus to the STF from the one or more electrical charge sources 130.

In some example embodiments, the control circuit's logic is implemented as computer code configured to be executed on a computing circuit (such as a microprocessor or suitable computing device) to perform the control steps that are part of the exemplary methods for rapid mold fabrication. For ease of description, this processing logic (e.g., ASIC, FPGA, processor, custom circuit, or the like) will be referred to as a controller throughout. For further ease of description, this controller will be programmable by code to perform the control logic (or otherwise customize the circuit to perform its intended purpose). Although not shown, the controller 140 is electronically connected to or in data communication with the various electronically controlled components of the system 100 by a wired connection or wireless communication connection (not shown). Although not shown, it should be understood that the controllable system components (e.g., the electrical current source 130, hydraulic pillars 110, and fluid source 135) can comprise control electronics (not shown) among other computer-controlled devices associated therewith, such as valves, actuators, sensors and the like.

The mold frame 105 comprises one or more structural walls that encompasses the fabrication area 160 within which the pillars 110 are moveable and molds can be fabricated. For simplicity, FIG. 1 shows the mold frame having only a back wall extending vertically behind the pillars 110 and omits additional walls (e.g., side, top, bottom and front walls) or other structural members of the frame necessary for supporting the components of the system.

The pillars 110 are rods that can be mechanically extended or retracted in the vertical direction 150 (i.e., Z axis) to respective heights. The rods can be independently controlled by the controller, which sets the height of the rods in accordance with the prescribed shape and geometry of the final mold, which can be specified in a design file (e.g., a computer aided design, CAD, file). Although not apparent from the side-view of FIG. 1, the pillars 110 are arranged over a two-dimensional plane extending along the X axis 152 and the Y axis 154, which extends perpendicularly to the X axis 152 and Z axis 150. The pillars 110 preferably have a small diameter and are closely arranged next to each other in a two-dimensional array, this, in combination with independently adjusting the height of each pillar, enables the system to precisely construct any shape object or surface profile.

Provided above the distal end of the pillars 110 is the boundary layer 120. The distal ends of the pillars push or pull against the boundary layer 120. The boundary layer 120 is a flexible material such that it can move and stretch as the pillars are adjusted to define a particular shape. Above the boundary layer 120 is the interface layer 125. The boundary layer 120 and the interface layer 125 each extend generally in the X-Y plane and define the top and bottom walls of an expandable fluid chamber, such as a bladder. Preferably, the fluid chamber is sealed and fluid non permeable and thus can include side-walls sealingly connecting the layers 120 and 125. During operation, a prescribed volume of STF 115 can be pumped from the external fluid storage unit 135 via one or more fluid pumps (not shown) and hoses into the sealed volume between the boundary layer 120 and the interface layer 125.

The interface layer 125 is a preform layer against which the material to be formed into a mold can be placed. The interface layer 125 and boundary layer 120 are collectively referred to as the preform layers. In some embodiments, the outer surface of the interface layer can be an anti-stick material or include an anti-stick coating to prevent adhesion and facilitate the release of a mold from the interface layer after fabrication. Exemplary anti-stick materials can include silicon or a coating of Polytetrafluoroethylene (PTFE) spray on the outer surface. The interface layer 125 is configured to allow for fine finishing. More specifically, the interface layer provides a smooth surface for imparting a smooth finish on the mold surface. The interface layer can comprise a material selected based on the particular type of material used to form the finished mold.

As noted, the STF 115 is a non-Newtonian material that can be changed from a liquid phase to solid phase by application of an electrical current or another type of stimulus to the STF. Such materials are also named dilatants and they show increases in viscosity when the shear strain increases. STF materials consist of a medium and suspended particles. The combination of those two materials defines both the STF properties as well the STF's response to one or more types of external stimulus. In one or more embodiments, the STF 115 is an electrorheological STF. Electrorheological STFs are responsive to an electrical field as the suspended particles are field-responsive. One exemplary electrorheological STF is silica gel wherein the silica particles are the suspended particles and field-responsive. Other STFs are magnetic field responsive. Electrical/magnetic field responsive shear thickening fluids typically include electrical/magnetic-responsive particles dispersed or suspended in a carrier fluid medium. In the presence of an electric/magnetic field, the electric/magnetic-responsive particles become polarized and get organized into chains of particles or particle fibrils within the carrier fluid. The chains of particles act to increase the viscosity or flow resistance of the overall materials resulting in the development of a solid phase of the material.

The controller 140 is configured to control the pumping of the STF 115 from where it is stored when not in use (i.e., the fluid source 135) into the fluid chamber between the preform layers (i.e., boundary layer 120 and interface layer 125). In some embodiments, the system 100 can comprise a separate supplying tool, including, one or more STF pumps, configured to control the composition and/or the volume of STF that is provided between the preform layers, which can allow for more freedom in controlling the final mold shape.

In one or more embodiments, the supplying tool can be configured to specifically control the particular type or composition of the STF material used in the system 100.

More specifically the supplying tool can comprise storage containers for containing the separated raw materials that can be selectively combined to construct different types of STF materials for use in the system 100. The raw materials usually would comprise the particles and matrix used for the STF 115. The components of the supplying tool can further include pumps, volume and composition measuring sensors, mixing containers and the like which are configured to be controlled by the controller to create different mixtures of STF that correspondingly react differently to different stimulus based on the engineering needs of a particular application or design.

In one or more embodiments, the supplying tool can also be used to control the volume of STF in the chamber. For instance, the controller 140 using one or more of the supplying tool (e.g., an STF volume control pump) and the pillars 110, can be configured to control the volume of STF across each pillar. The STF volume over a respective pillar can vary based on the pressure applied on the layer of STF 115 within the chamber (also referred to as the "STF layer") by respective pillars. The controller 140 can be configured to precisely control the STF volumes over one or more pillars as a function of models generated based on fluid mechanics and volume pressure relationships.

As one non-limiting practical example, to create a sphere-shaped part using the system 100, the pillars 110 are selectively pushed against the layer of STF 115 within the chamber to make that general shape. Looking at the STF chamber, regions in which the STF layer thickness is desired to be thin can be filled with a lower volume of STF and/or the position of the pillars can be adjusted to adjust the volume of STF in one region relative to another. The STF volume control allows for precision in shaping the STF layer within the chamber and thus shaping the interface layer 125.

Using non-Newtonian fluids provides benefits over other shape memory materials like shape memory polymers (SMP) due to the flexibility in STF volume control. For example, if little STF is provided between the preform layers, a resulting mold can have a surface with edges, bumps, ridges or pixelated texture imparted by the rigid pillars. Increasing the volume of the STF between the preform layers and thus STF layer thickness can smooth out the contour of the mold and avoid individual pillars imparting their shape onto the mold. The STF volume control allows for precision in shaping the STF layer and thus shaping the interface layer 125.

As noted, the controller 140 is configured to selectively adjust the height of the pillars 110 according to a prescribed geometric shape of the mold to be produced. Additionally, while the STF is held to shape between the preform layers by the pillars 110, the controller is configured to cause the one or more charge sources 130 and associated circuitry 132 to apply an electrical stimulus to the STF that is suitable for transitioning the STF from a liquid to a solid state. Precise and coordinated control of the pillars 110, which controls the rough shape of the mold, and the STF, which enables fine detail control, enables the system 100 to rapidly produce a mold with a custom shape and that can then be used in a part molding process.

According to a salient aspect, the system 100 is configured to rapidly produce molds having a complex shape. The complex shape begins to take place when the pillars 110 are adjusted and effectively sandwich the STF layer 115 in its fluid state against an object (i.e., the interface layer 125), similar to how fluids takes the shape of a container. Additionally, as further described herein, the controller's ability to control the STF viscosity via an electrical field is another element to effectively creating the complex shaped mold.

In some embodiments, the one or more electrical charge sources 130 are configured to selectively and controllably apply an electrical stimulus to the STF via a signal emitter electrically coupled to the source. The electrical stimulus can be for example and without limitation, an electric field and/or current. The electric field can be emitted using one or more electric field emitting circuits 132 that extend over the length and/or width of the boundary layer 120. Additionally, in some embodiments, the electrical charge source and field-emitting circuitry can be arranged such that the electric field used to control the STF can be selectively applied to portions of the STF chamber thereby differentially activating the STF as a function of location. FIG. 1B is a top-view diagram showing an exemplary configuration of multiple electric signal emitting circuits 132 on or within the boundary layer 120 of system 100 in accordance with one or more embodiments. In this non-limiting exemplary configuration, the circuits 132 comprise a plurality of wires that are spaced apart in the x-direction across the boundary layer 120 and that extend across the boundary layer in the y-direction. The circuits 132 are each electrically connected to the electrical charge source 130. Additionally, the electrical charge source 130 can also be configured to modulate the STF stimulating signal parameter (e.g., the electric field intensity or magnitude) such that it is differentially applied by one or more of the circuits 132 across the boundary layer 120 for location-specific control of the STF viscosity. The STF viscosity can thus be dynamically controlled both in terms of location, and temporally throughout the whole process. This allows for the creation of complex mold shapes and adoption of this technology for composite manufacturing. Hence, the system 100 is referred to as an "active" self-shaping non-Newtonian fluid based system for rapid mold tooling.

Following is a simplified practical example of how the system 100 can be configured to dynamically and actively control the STF viscosity (among other system parameters) in a time and location-specific manner to create a complex mold shape. In the example, a box shape is molded using the system 100 by first adjusting the pillars 110 and activating the STF 115 within in the fluid chamber to create a negative mold shape of a box. Thereafter, the formation area 160 can be injected with a polymer material for forming into the desired box shape. As the material is still not completely solidified, a tip or an edge in the box can be dynamically formed by the system in a particular region of the box. More specifically, the controller 140 can cut the electrical stimulus applied by a circuit 132 branch at the particular region which, as a result, changes the STF layer at that region into a fluid. The position of one or more pillars at that region can then be selectively adjusted and the STF stimulated again to a solid state in order to form the tip or edge of the box.

Figure 2A:
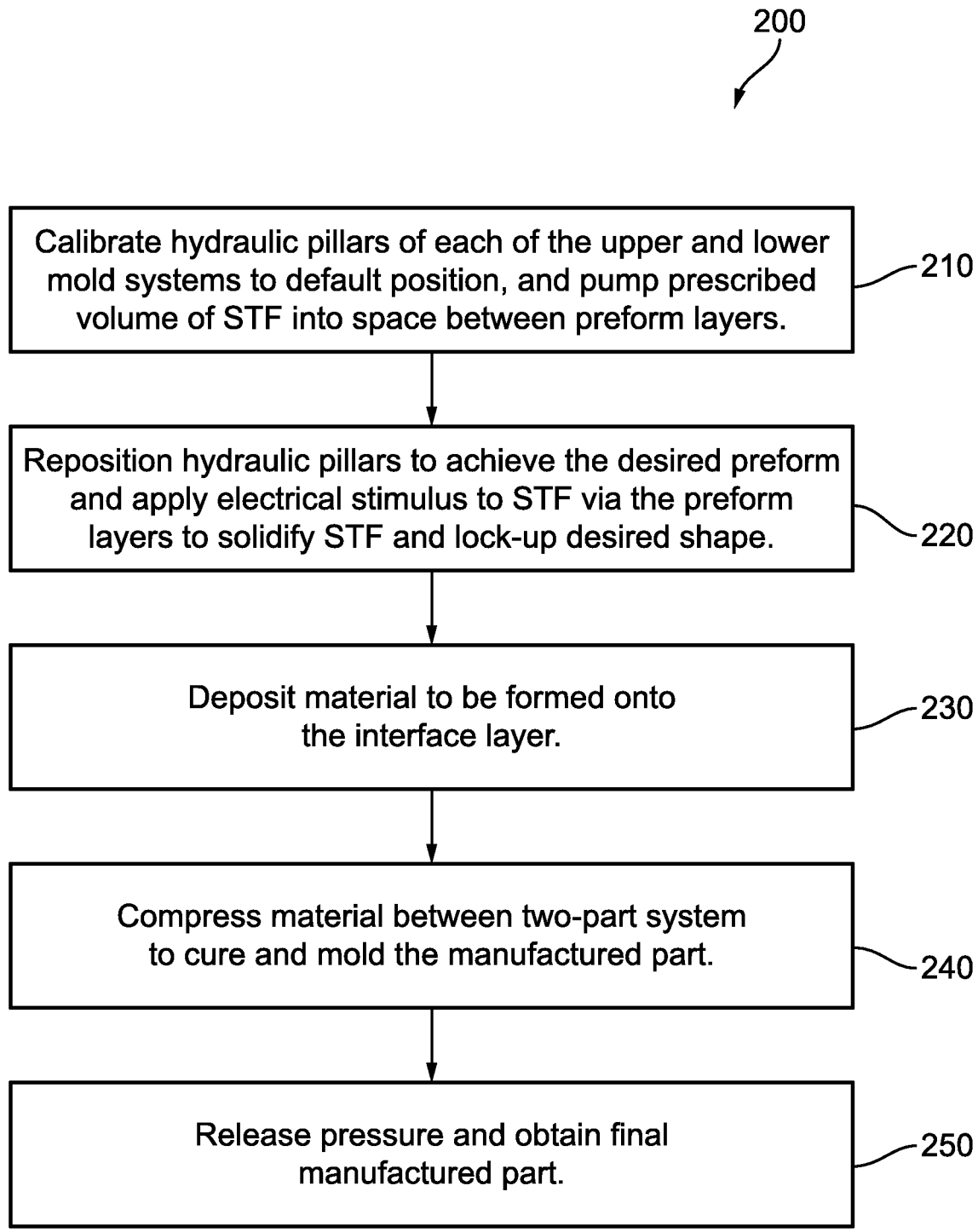
FIG. 2A is a flow chart illustrating an exemplary routine for rapid manufacture of mold tooling using the system of FIG. 1 according to an embodiment.
Figure 2B:
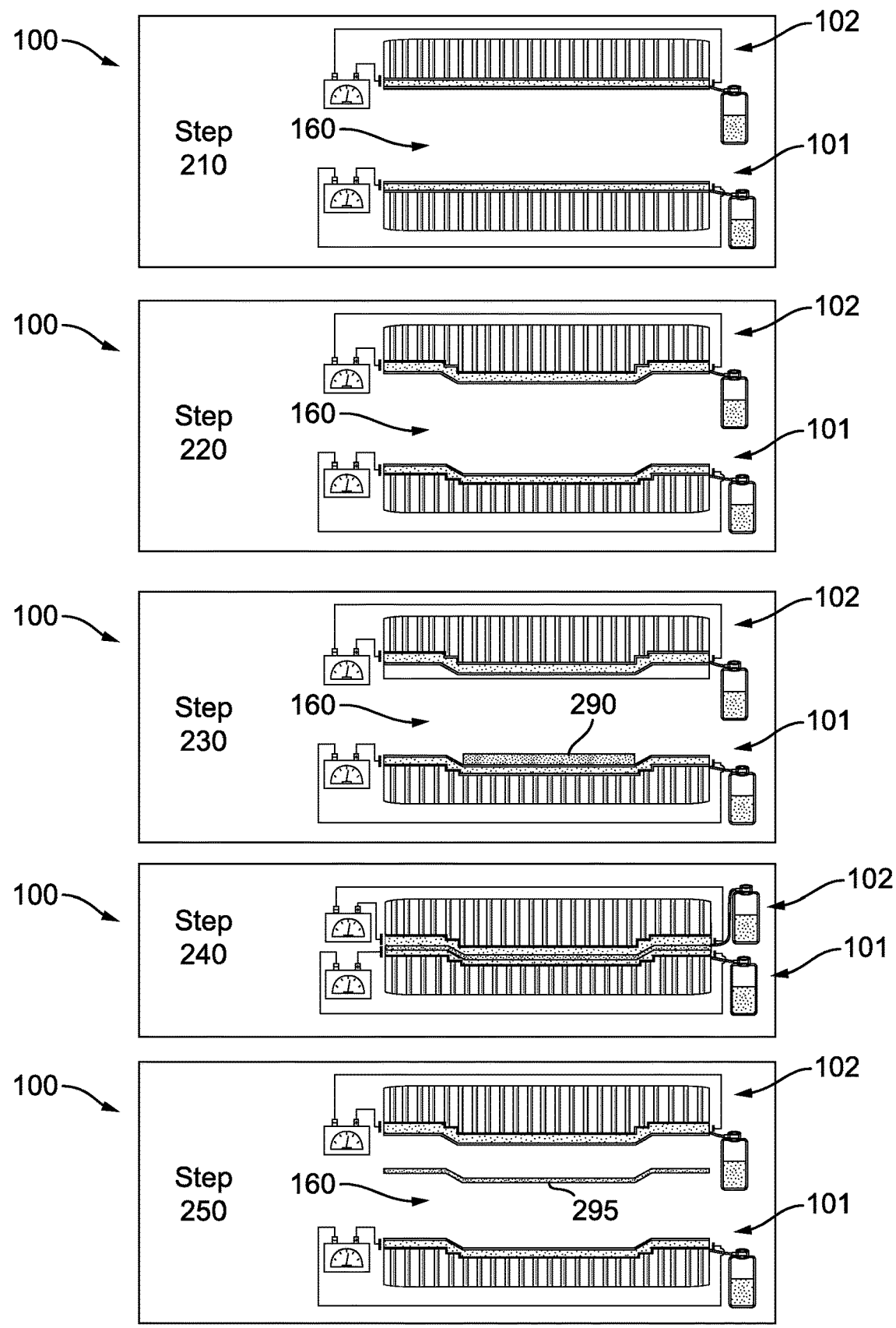
FIG. 2B includes a series of side-view system diagrams showing the state of an exemplary rapid mold fabrication system at steps of the routine of FIG. 2A according to an embodiment.

FIG. 2A is a process flow-diagram illustrating an exemplary routine 200 for creating a mold for use in manufacturing a compression-molded part using the system 100. FIG. 2B includes a series of side-view system diagrams showing the system 100 comprising an upper molding unit 102 and lower molding unit 101 as shown and described in FIG. 1. The series of system diagrams in FIG. 2B further illustrate the dynamic state of the system 100 during respective steps of the method 200.

Some or all of the method 200 can be performed using components and techniques illustrated in FIG. 1. Portions of this and other methods disclosed herein can be performed on or using the controller 140 or other such custom or preprogrammed logic device, circuit, or processor, such as a programmable logic circuit (PLC), computer, software, or other circuit (e.g., ASIC, FPGA) configured by code or logic to carry out their assigned task. The controller device, circuit, or processor can be, for example, a dedicated or shared hardware device (such as a laptop, a single board computer (SBC), a workstation, a tablet, a smartphone, part of a server, or a dedicated hardware circuit, as in an FPGA or ASIC, or the like), or computer server, or a portion of a server or computer system. The controller device, circuit, or processor can include a non-transitory computer readable medium (CRM, such as read-only memory (ROM), flash drive, or disk drive) storing instructions that, when executed on one or more processors, cause portions of the method 200 (or other disclosed methods or steps) to be carried out. It should be noted that in other embodiments, the order of the operations can be varied, and that some of the operations can be omitted. Some or all of the method 200 can also be performed using logic, circuits, or processors located on or in electrical communication with the system 100 configured to carry out the method 200.

It should be understood that the steps of method 200 are performed for each of the upper molding unit 102 and lower molding unit 101, wherein the upper molding unit is specifically configured to define the geometry of one side of the mold being produced by the system 100 (e.g., the upper half) and the lower molding unit 101 is configured to define the geometry of the opposite side of the mold (e.g., a lower half).

The method 200 begins at step 210, where the controller 140 calibrates the hydraulic pillars 110 to a default position. For example, as shown the pillars are extended to an even height, say, halfway between fully extended and fully retracted or some other suitable starting position given the intended shape of the finished mold. Additionally, at step 210 the controller causes the STF 115 to be pumped from storage 135 to fill the fluid chamber between the preform layers 125 and 120 to a prescribed volume.

At step 220, the hydraulic pillars 110 are selectively repositioned to achieve the desired preform shape by pushing or pulling against the boundary layer 120 and translating the shape defined by the pillars to the STF sandwiched between the preform layers 120 and 125. Simultaneously, the controller 140 causes the one or more electric charge sources 130 to pass an electrical signal via the signal emitting circuitry 132 provided over the preform layer to solidify the STF and "lock-up" the desired shape to be imparted onto the mold being formed.

At step 230, the material to be formed using the system 100 into a finished mold is deposited into the fabrication area 160. For instance, as shown in FIG. 2B, the unformed material 290 is provided on the top surface of the interface layer 125 of the lower molding unit 101.

At step 240, compression of the material between two-part system takes place to cure and mold the manufactured part. Specifically, the upper and lower units are controllably moved together to compress the material 290 between the interface layers of the upper and lower units as necessary to transform the material into a mold having the shape defined by the upper and lower units. Although not shown, the compression step can also involve maintaining the material under compression at a prescribed pressure and for a prescribed period of time. Additional steps of heating, cooling, among other conventional process steps used in forming a mold, can also be performed using the system 100 at step 240.

At step 250, the pressure of the upper and lower units' interface layers against the material is released by separating the upper and lower units, 102 and 101, such that the final manufactured mold/part 295 having the desired shape can be removed from the system 100.

The range of shapes the exemplary systems and methods for rapid mold fabrication can create is very broad. Additionally, hollow shapes can be achieved via addition of additional engineering solutions, such as placing a hollow shape in the mold fabrication area with the material 290 disposed about the hollow shape such that the preform layers form the material around the hollow shape into the finished mold. Various hollow objects can be formed in this manner, by adding different shapes into the mold material and forming molded objects having hollow internals.

Moreover, the pillars can push the STF layer to the end or edge of the other mold to create somewhat hollow shapes and the material can be injected from both sides to allow the flow to reach all areas.

Although the foregoing discussion has been directed to an exemplary system and method for rapid compression mold fabrication, a similar combination of components and processes can be used for injection mold fabrication.

Figure 3:
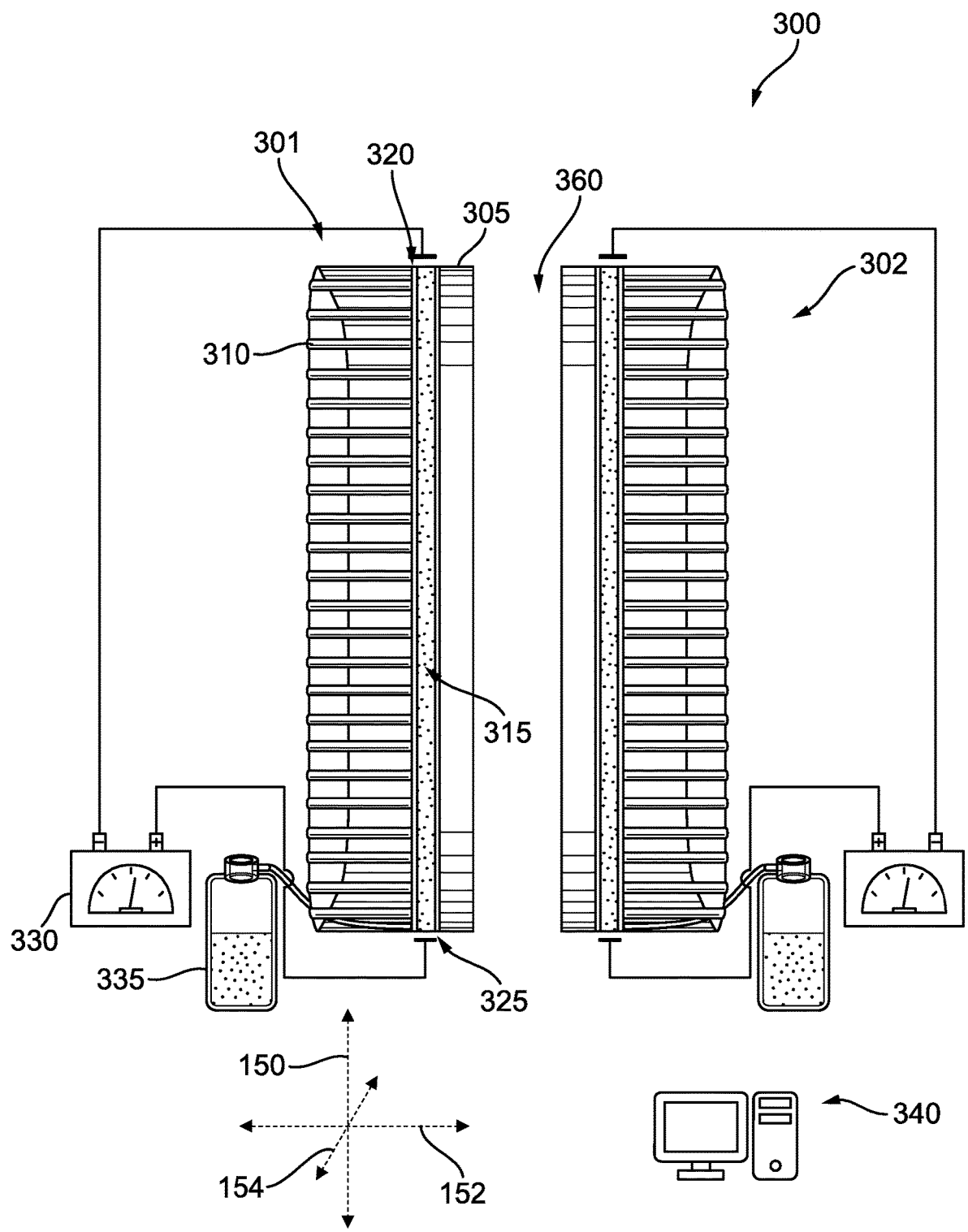
FIG. 3 is a side-view system diagram of an exemplary rapid mold fabrication system according to an embodiment.

FIG. 3 is a high-level side-view system diagram of an exemplary rapid mold fabrication system using a non-Newtonian STF 300 in accordance with one or more embodiments. The system 300 is a variation of the system 100 in that system 300 is adapted for injection mold manufacturing, but operates on the same active self-shaping molding principals as the system 100. Whereas the system 100 comprises upper and lower molding units, the system 300 comprises a left-side molding unit 301 and a right-side molding unit 302, which mirrors and is provided opposite the left-side unit, such that an injection molded mold/part can be formed in the mold fabrication space 360 between the units.

As would be understood, the left molding unit 301 is used to define the geometry of one side of the part being produced by the system 300 (e.g., the left half) and the right-side molding unit 302 is used to define the geometry of the opposite side of the part (e.g., the right half). During the mold formation process, the left and right-side units impart their respective shapes onto the unformed material, thereby producing a final mold having the desired shape.

The left and right-side units of the system 300 comprises the following primary components, a mold frame 305, hydraulic pillars 310, an STF 315, a boundary layer 320 and an interface layer 325 defining a fluid chamber, one or more electrical charge sources 330, and a fluid storage unit 335 for containing the STF when not in use. The system also comprises one or more controllers 340. These elements operate in the same manner as the corresponding components of system 100 that are shown and described in connection with FIGS. 1-2B.

Figure 4A:
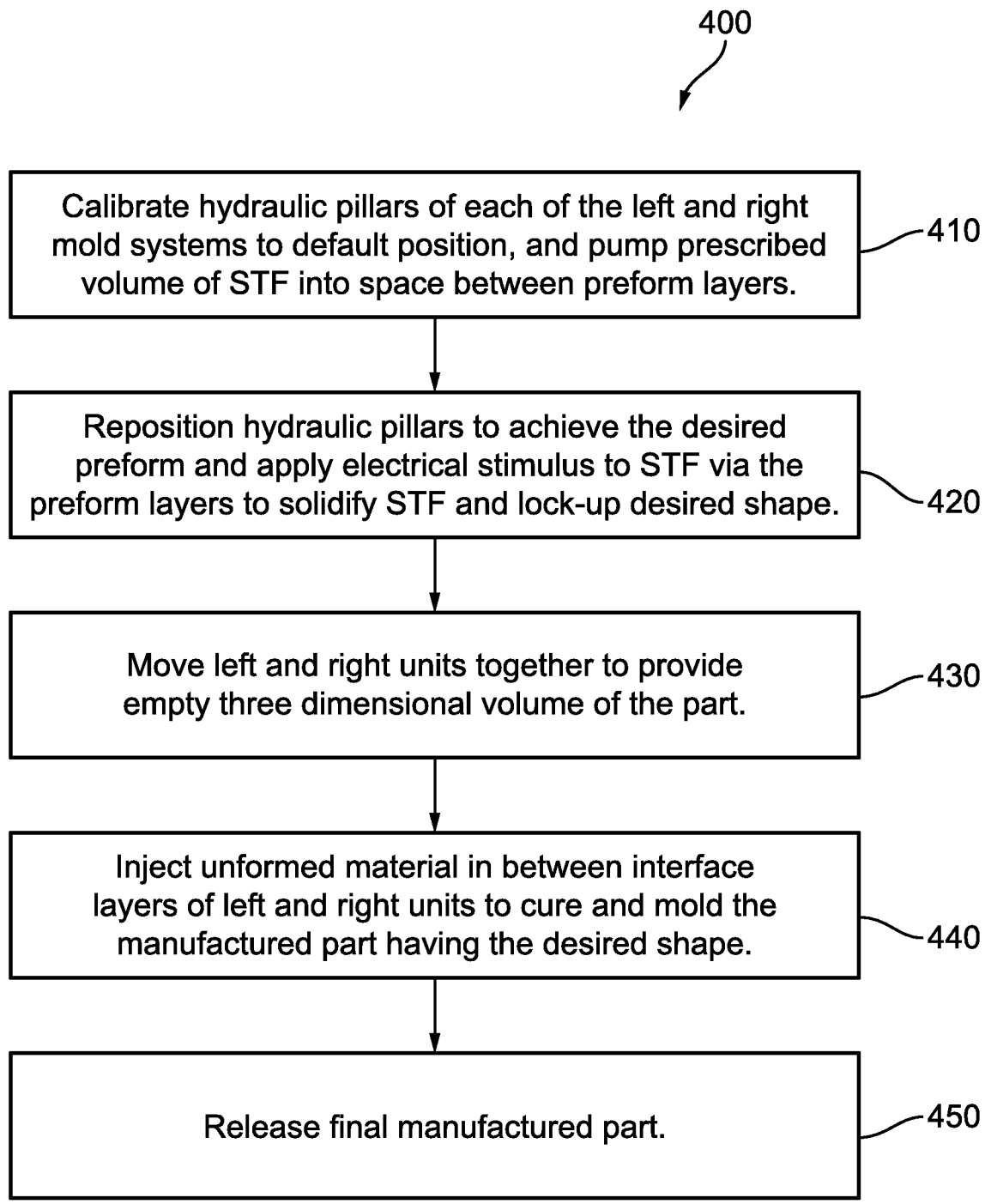
FIG. 4A is a flow chart illustrating an exemplary routine for rapid manufacture of mold tooling using the system of FIG. 3 according to an embodiment.
Figure 4B:
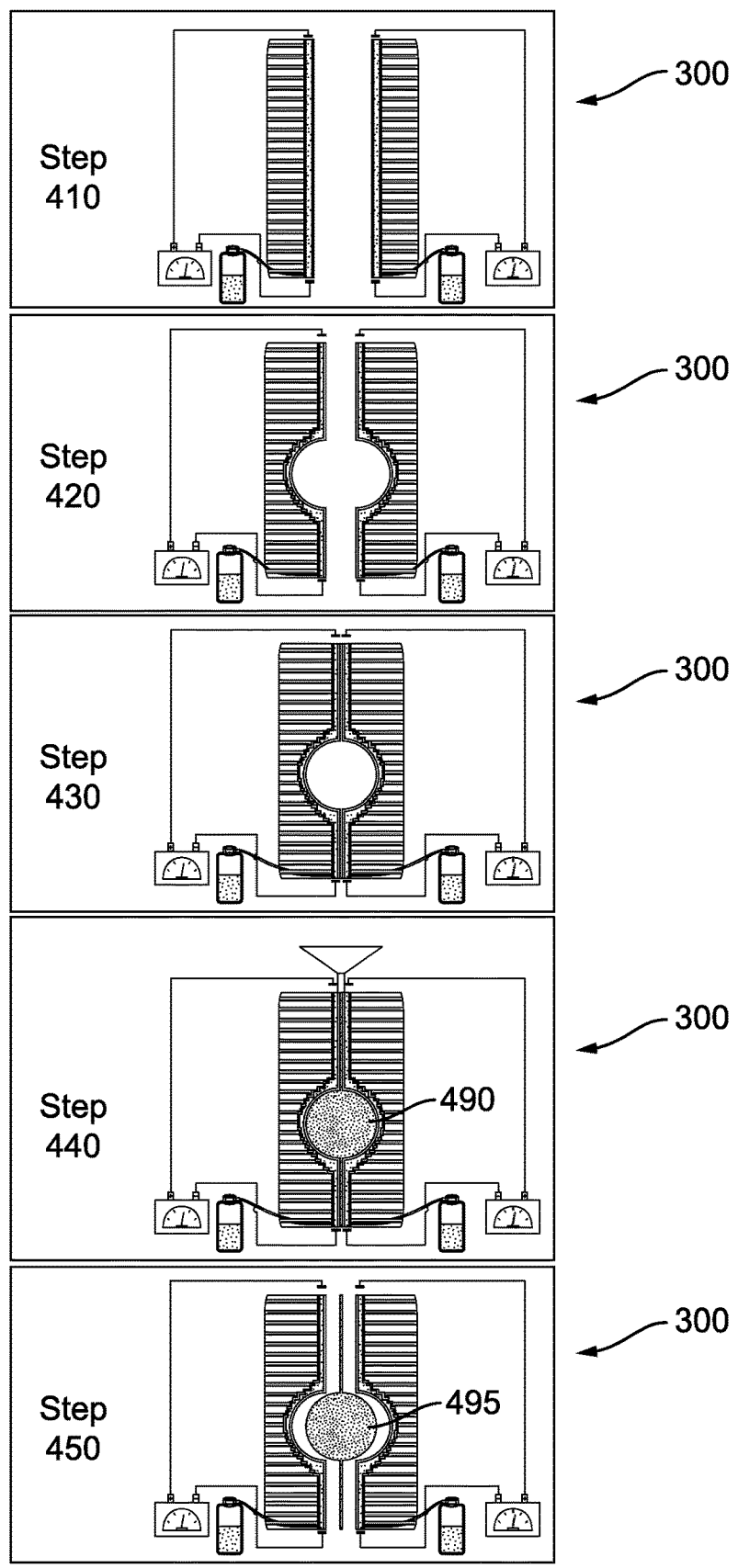
FIG. 4B includes a series of side-view system diagrams showing the state of an exemplary rapid mold fabrication system at steps of the routine of FIG. 4B according to an embodiment.

FIG. 4A is a process flow-diagram illustrating an exemplary routine 400 for injection-forming a mold (or more generally a part) using the system 300. FIG. 4B includes a series of side-view system diagrams showing the system 300 and illustrates the dynamic state of the system 300 during respective steps of the method 400.

It should be understood that the steps of method 400 are performed for each of the left molding unit 301 and right-side molding unit 302. The process 400 begins at step 410, where the controller 340 calibrates the hydraulic pillars 310 to a default position. For example, as shown the respective length of the pillars are adjusted in the in the horizontal X direction 152 to an even length. Additionally, at step 410 the controller causes the STF 315 to be pumped from storage 335 to fill the space between the preform layers 325 and 320 to a prescribed volume.

At step 420, the hydraulic pillars 310 are selectively repositioned to achieve the desired preform shape by pushing or pulling against the boundary layer 320 and translating the shape defined by the pillars to the STF 315 sandwiched between the preform layers. Simultaneously, the controller 340 causes the one or more electric charge sources 330 to pass an electrical signal via the signal emitting circuitry provided over one or more of the preform layers 320 and 325 to solidify the STF and "lock-up" the desired shape to be imparted onto the mold being formed. Step 410 to 420 are similar to steps 210-220 of the compression mold manufacturing method 200.

At step 430, the two halves of the system 300 are moved together to create the empty three-dimensional space within the which a material can be injected in order to form a mold having the shape defined by the respective interface layer 325 of the left and right units.

At step 440, the unformed material to be molded into the desired shape is injected into the empty space between the interface layers of the left and right units. As should be understood, the system 300 can include a suitable material injection system (not shown) for injecting the material into the fabrication area 360. Additionally, at step 240, the injection molded part is formed and cured for example, by heating, cooling, applying pressure or other conventional process steps used in injection molding.

At step 450, the left and right units are separated and the final manufactured molded part 495 having the desired shape is released from the system 300.

In accordance with one or more embodiments, the exemplary systems and methods for rapid mold fabrication using non-Newtonian fluids can be configured for use as a reader of shapes. In particular, in a shape reading configuration, an object of any shape can be put into the system (e.g., 100 or 300) while the hydraulic pillars (e.g., pillars 110 or 310) and the layer of STF (e.g., STF 115 or 315) are in a non-rigid "soft" state, and the system is configured to determine the geometric dimensions of the object. This technique allows for reverse engineering of any complex shape and further enables rapid mold tooling for recreating those complex shapes. The geometric dimensional data of the object and the system parameters/settings measured during shape reading can subsequently be reused by the system, applying the stimulus to the system to construct a rigid mold for manufacturing the component.

Figure 5A:
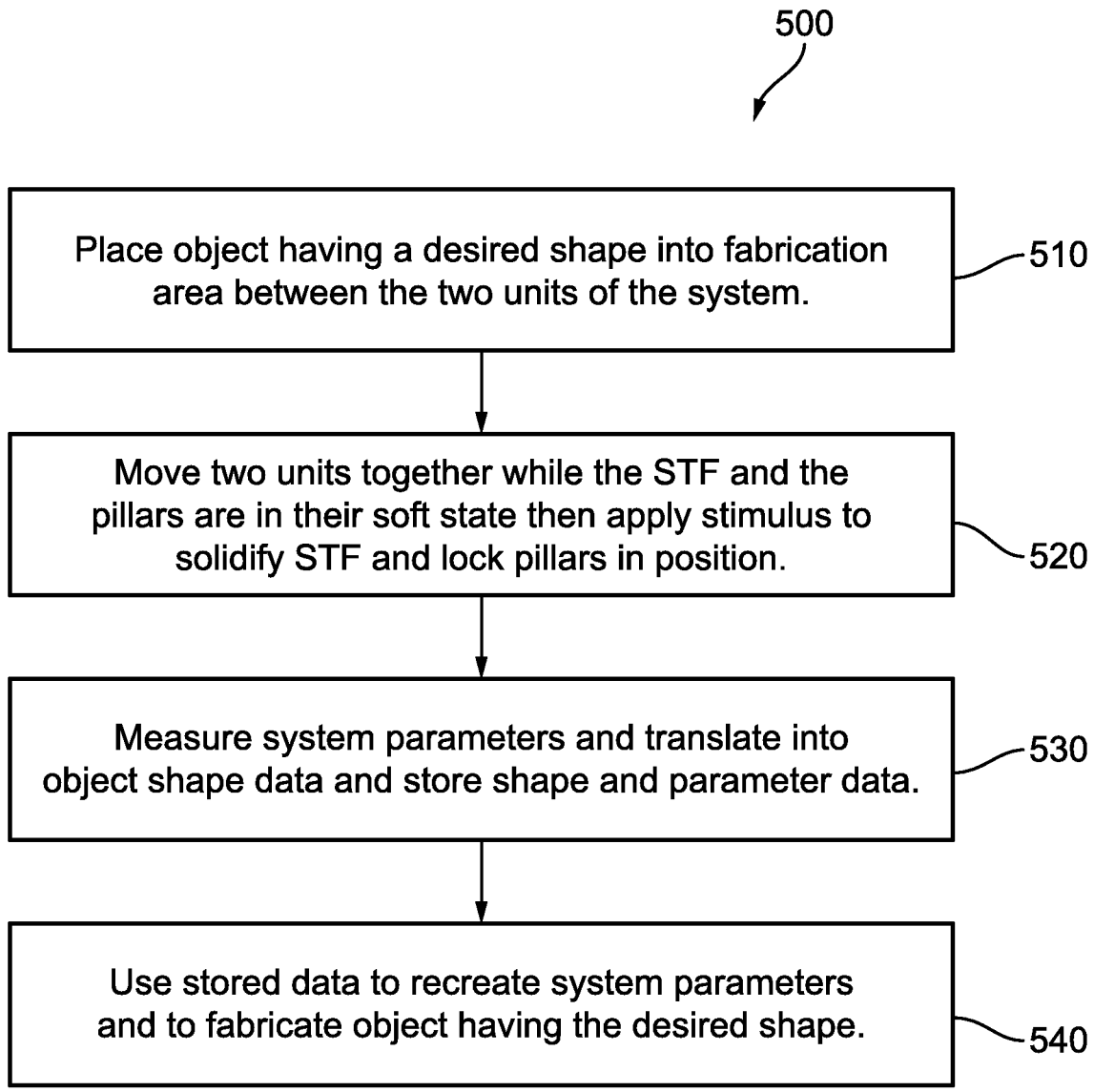
FIG. 5A is a flow chart illustrating an exemplary routine for object shape reading using the system of FIG. 3 according to an embodiment.
Figure 5B:
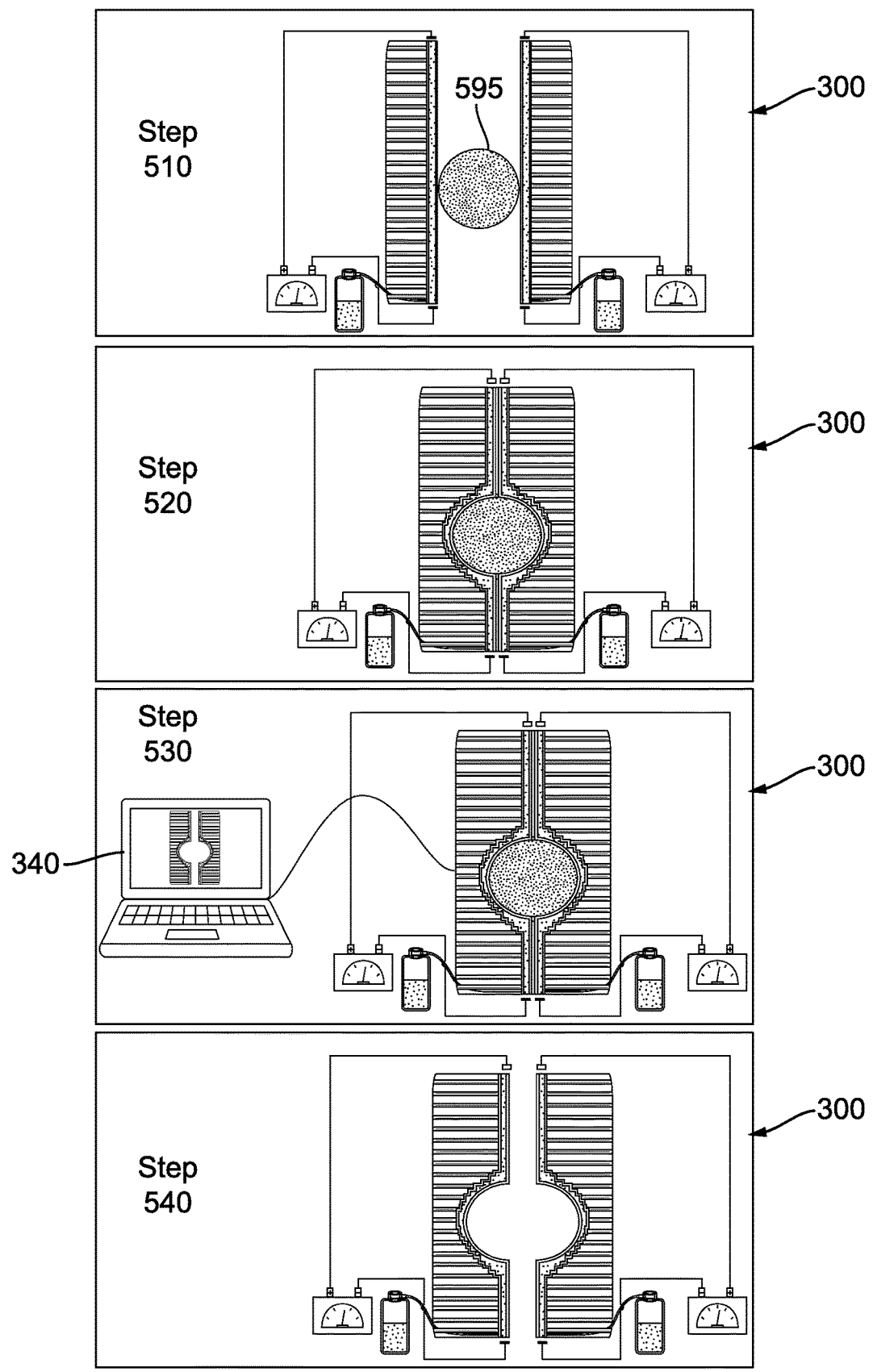
FIG. 5B includes a series of side-view system diagrams showing the state of an exemplary rapid mold fabrication system at steps of the routine of FIG. 5A according to an embodiment.

FIG. 5A is an exemplary process-flow diagram illustrating an exemplary method 500 for operating the system 300 in a shape-reading mode for determining and recording both the geometry of an object and the system parameters necessary for producing a molded part having the same geometry/shape as the measured object. FIG. 4B includes a series of side-view system diagrams showing the system 300 and illustrates the dynamic state of the system 300 during respective steps of the method 500. While the method 500 is performed using the system 300, it should be understood that the system 100 can similarly be operated as a shape-reading and object replication system by performing the same steps.

The method 500 begins at step 510, when an object 595 having a desired shape is placed into the fabrication area 360 while the left and right units of the system 300 are separated.

At step 520, while the object is between the left and right units, the two units are moved together until fully closed around the object. Full closure can be achieved, for example, by moving the two units together until at least the outermost rods around the periphery of the two halves touch and thereby eliminate any gaps between the two halves. The two units are closed around the object while the STF 315 is in a liquid state or at least a soft, semi-viscous or non-rigid state. Additionally, the two units can be closed around the object while the pillars are in a "soft" or unlocked state that allows a pillar to be compressed when a sufficient opposing force is applied to its distal end. In this regard, step 520 can also involve pushing the pillars outward until a resistance against the extension of the pillars is observed. This resistance can be caused, for example, by a pillar pushing against the object or against a pillar of the opposing unit and can be measured using a suitable pressure or force sensor (not shown) provided on each pillar. Ultimately, the foregoing steps cause the STF and the pillars to conform to the shape of the object sandwiched between the left and right units of the system 300. Lastly, step 520 also includes the step of the one or more electronic sources 330 electrically stimulating and solidifying the STF and locking the pillars at their respective lengths/positions.

Then at step 530, the controller 340 is configured to measure various parameters or setting of the components of the system 300. The measured system parameters can include, for example, the volume of the STF between the preform layers, the number of pillars surrounding the object, the respective length/position of each of the pillars, the required electrical current to stimulate the volume of STF, among other system component parameters that were defined as a result of step 520.

Additionally, at step 530, the controller can be configured to determine the shape of the object from the measured system parameters. For instance, the shape of the object can be inferred from the measured height of the pillars and the volume of the STF. Additionally, at step 530, the measured system parameters and object shape information can be stored by the controller 340 to a non-transitory computer readable storage medium or memory for future reference. The controller 340 can similarly be configured to output the measured and stored information to a user via a user interface such as a display device.

At step 540, the system 300 can be used to fabricate an object having the same shape as the measured object by implementing the method 400 according to the stored system parameters measured at 530.

It should be noted that although much of the foregoing description has been directed to rapid mold tooling fabrication systems for manufacturing molds usable in compression or injection molding manufacturing processes, the systems and methods disclosed herein can be similarly deployed for making molds or tools suitable for use in other manufacturing processes, say, blow molding, casting and the like. Additionally, the systems and methods can similarly be used for making parts as well.

At this juncture, it should be noted that although much of the foregoing description has been directed to a rapid mold tooling fabrication system using active self-shaping non-Newtonian fluid and other such devices, the systems and methods disclosed herein can be similarly deployed and/or implemented in scenarios, situations, and settings far beyond the referenced scenario.

It is to be understood that like numerals in the drawings represent like elements through the several figures, and that not all components and/or steps described and illustrated with reference to the figures are required for all embodiments or arrangements.

The flowchart and block diagrams in the figures illustrate the architecture, functionality, and operation of possible implementations of systems and methods according to various embodiments and arrangements. In this regard, each block in a flowchart or block diagrams as it relates to a computer implemented method can represent a module, segment, or portion of code, which comprises one or more executable instructions for implementing the specified logical function(s). It should also be noted that, in some alternative implementations, the functions described herein or noted in a block diagram may occur out of the order noted. For example, two blocks or operations shown or described in succession may, in fact, be executed substantially concurrently, or may sometimes be executed in the reverse order, depending upon the functionality involved. It will also be noted that functional blocks or operations can, where applicable, be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A rapid mold tooling fabrication system using non-Newtonian shear thickening fluid (STF), the system comprising:
   at least one molding unit comprising:
      a frame encompassing a fabrication area;
      a plurality of actuatable hydraulic pillars arranged in a two-dimensional array, wherein each hydraulic pillar extends in a first direction to a distal end and is configured to be extended or retracted along the first direction;
      an expandable STF chamber comprising a first preform layer and an opposing second preform layer,
         wherein the first preform layer is a boundary layer and extends across the distal ends of the hydraulic pillars such that the pillars push or pull against the boundary layer when extended or retracted, and
         wherein the second preform layer is an interface layer having an outer surface against which a mold can be formed;
   a fluid storage container for storing the STF and a pump configured to pump the STF from the fluid storage container into the STF chamber during operation;
   a signal emitter circuit provided at one or more of the first and second preform layers, wherein the signal emitter circuits is configured to emit an electric signal into the STF, wherein the electric signal stimulates the STF and thereby transitions the STF from a liquid to a solid state; and
   a controller, the controller comprising a non-transitory computer readable storage medium and a processor electronically coupled to the storage medium, the signal emitter circuit and the fluid storage container, wherein the processor is configured by executing instructions stored on the storage medium to:
      cause the plurality of pillars to respectively extend or retract according to a prescribed shape,
      cause STF to be pumped from the fluid storage container into the STF chamber,
      cause the signal emitter circuit to emit the electric signal into the STF within the chamber and thereby transitioning the STF from a liquid to a solid state, and
      after transitioning the STF from the liquid to the solid state, initiating a molding process during which a material placed against the outer surface of the interface layer is compressed against the interface layer to form the mold having the prescribed shape.

2. The system of claim 1, wherein the processor is further configured to cause a prescribed volume of STF to be pumped into the STF chamber as a function of the prescribed shape.

3. The system of claim 1, wherein the processor is further configured to selectively modulate an intensity of the electric signal as a function of time during forming of the mold.

4. The system of claim 1, wherein a plurality of signal emitter circuits are arranged at respective locations over the boundary layer, and wherein the processor is further configured to cause the electrical signal to be selectively emitted from one or more of the plurality of signal emitter circuits as a function of location.

5. The system of claim 1, wherein the outer surface of the interface layer comprises a non-stick material.

6. The system of claim 1, further comprising: two opposing molding units arranged on opposing sides of the fabrication area, wherein compression of the material between the interface layer of a first molding unit and the interface layer of a second molding unit forms the mold having the prescribed shape.

7. The system of claim 1, wherein the molding process comprises one or more of a compression molding process and an injection molding process.

* * * * *